(12) United States Patent
Hystad et al.

(10) Patent No.: US 8,816,524 B2
(45) Date of Patent: Aug. 26, 2014

(54) POWER SUPPLY SYSTEM

(75) Inventors: Egil Hystad, Stord (NO); Svein Magne Djuve, Stord (NO)

(73) Assignee: Wartsila Norway AS, Rubbestadneset (NO)

( * ) Notice: Subject to any disclaimer, the term of this patent is extended or adjusted under 35 U.S.C. 154(b) by 468 days.

(21) Appl. No.: 13/146,083

(22) PCT Filed: Feb. 11, 2010

(86) PCT No.: PCT/EP2010/051708
§ 371 (c)(1),
(2), (4) Date: Sep. 8, 2011

(87) PCT Pub. No.: WO2010/092113
PCT Pub. Date: Aug. 19, 2010

(65) Prior Publication Data
US 2012/0001486 A1    Jan. 5, 2012

(30) Foreign Application Priority Data
Feb. 13, 2009    (NO) .................................. 20090713

(51) Int. Cl.
*B60L 1/00*        (2006.01)
(52) U.S. Cl.
USPC ........................................................ 307/9.1
(58) Field of Classification Search
USPC ........................................................ 307/9.1
See application file for complete search history.

(56) References Cited

U.S. PATENT DOCUMENTS 6,650,537 B2    11/2003    Pereira et al.

FOREIGN PATENT DOCUMENTS

| GB | 1214880 A | 12/1970 |
|---|---|---|
| GB | 1456046 A | 11/1976 |
| NO | 20085145 B1 | 4/2011 |
| WO | WO-2005/119892 A1 | 12/2005 |

OTHER PUBLICATIONS

Xiaoyan, Xu et al, "New Concept of Power Quality Improvement Method in Marine Electric Propulsion System", IEEE, Sep. 12, 2004, pp. 211-214.
De Falco, S et al, "Nonstationary Models for PQ Monitoring in Naval Electrical Systems", IEEE., Jun. 11, 2008 , pp. 594-598.
Hoevenaars, A H et al, "Meeting New Marine Harmonic Standards", IEEE, Sep. 22, 2008, pp. 1-9.
Roider, Anton, "International Search Report", for PCT/EP2010/051708, as mailed Jul. 21, 2010, 4 pages.

*Primary Examiner* — Robert L. Deberadinis
(74) *Attorney, Agent, or Firm* — Winstead PC

(57) ABSTRACT

This invention relates to a power supply system comprising at least two drive units (3) having two power inputs and at least one power generator (G) providing electric power at a chosen system frequency and voltage. The system comprising a transformer unit (LLC) having a first and a second connection points (1,2), at least one of which being connected to a power generator (G), wherein the two inputs of each drive unit is connected to the first and the second connection point (1,2) of the transformer unit (LLC), and the transformer unit being adapted to provide a chosen phase shift between said inputs at the chosen system frequency and voltage.

9 Claims, 3 Drawing Sheets

POWER SUPPLY SYSTEM

This invention relates to a low loss, high redundancy power supply system comprising a rectifying bridge and inverter supplying current to a system including at least two power consumers, especially a power supply system on an installation having a number of motors and a number of power generators or power supplies.

In supplying power to electric motors, e.g. in electric propulsion systems or pump applications in offshore installations, it is common practice to utilize a rectifying bridge coupling coupled to a three phase power supply through a transformer, said transformer providing two AC supplies to the inputs of the rectifying bridge. A number of such systems are known, such as described in international patent publication No WO2005/119892 describing a system for suppressing harmonic voltages in the network, and for reducing the strain on the rectifiers in the system.

On large installations such as offshore installations or ships the power supply systems used are localized at each motor or power consumer, making them vulnerably to errors in the supply and the risk of e.g. loosing thrust in one motor, and therefore security systems and extra available power has to be available. It is also well known that when the power requirements reach a certain level an increase in the voltage of the power system is required so as to avoid to high short circuit level, again increasing the costs of the system.

The object of the present invention is thus to provide redundancy in the power supply system thus reducing the risk of completely loosing power in one part of the installation while also reducing the necessary system voltage. This is obtained using a system according to the independent claims.

The invention is based on the use of a so-called LLC transformer unit, e.g. as discussed in abovementioned WO2005/119892 where a transformer is used for removing harmonics in the power system by providing a phase shift over the transformer. According to the preferred embodiment of the invention the transformer unit is arranged so as to provide a 30° phase shift removing $5^{th}$ and $7^{th}$ harmonics and comprises an additional winding removing or damping the $11^{th}$ and $13^{th}$ harmonics.

As the transformer unit add an additional impedance to the system it also reduces the short circuit current in the system, which as a result allows for a higher power supplied to the system at a low voltage. This way standard 690V equipment may be used for higher power than with the known solutions.

The invention is described below with reference to the accompanying drawings, illustrating the invention by way of examples.

Figure 1A:
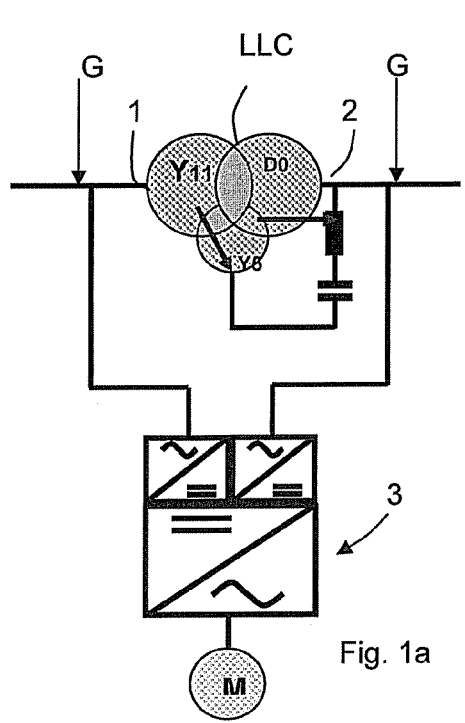

FIGS. 1a,b illustrates local supplies system with LLC transformers.

FIG. 2 illustrating a local supply system according to the invention

Figure 3A:
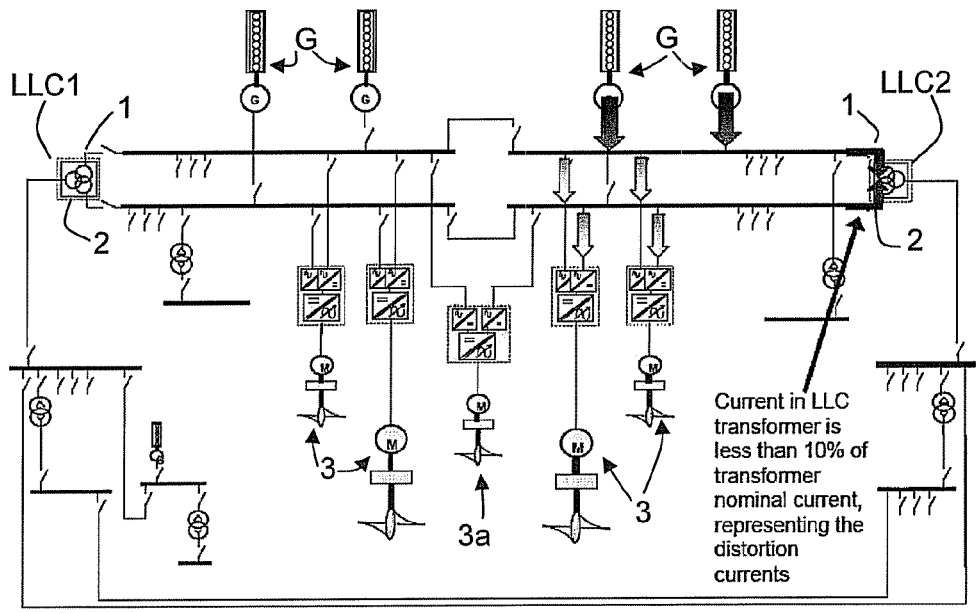

FIGS. 3a,b illustrating the system with symmetric and asymmetric power generation.

Figure 4A:
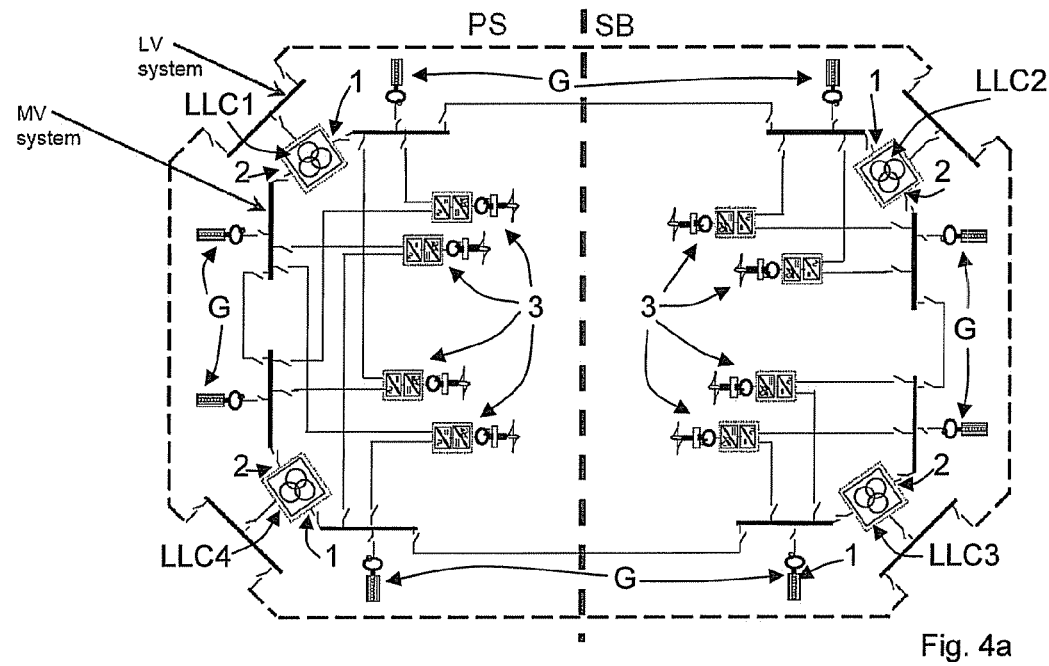

FIG. 4a illustrating the system implemented with four power systems.

Figure 4B:
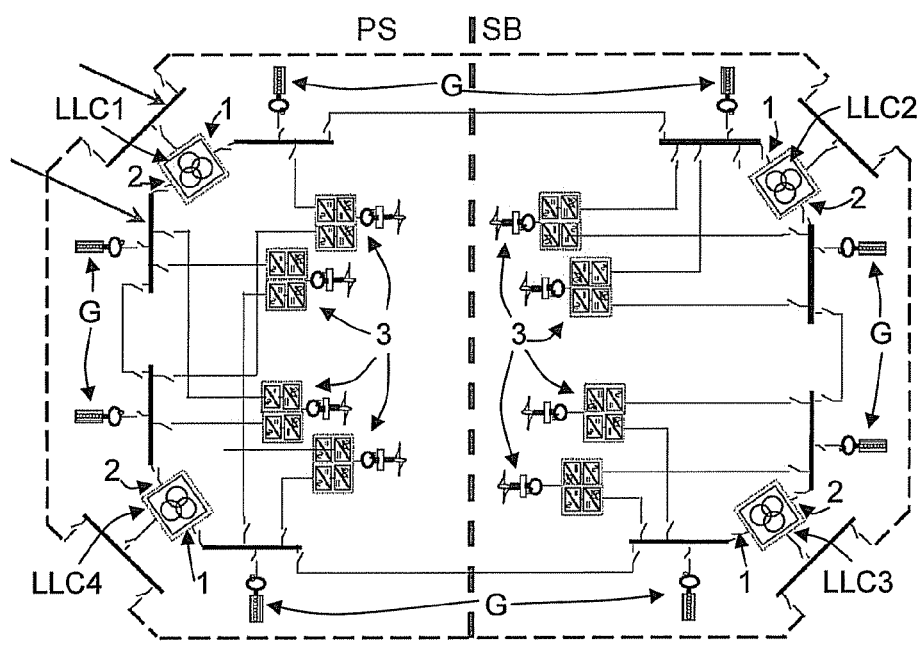

FIG. 4b illustrating an alternative to the system in FIG. 4a.

Figure 1B:
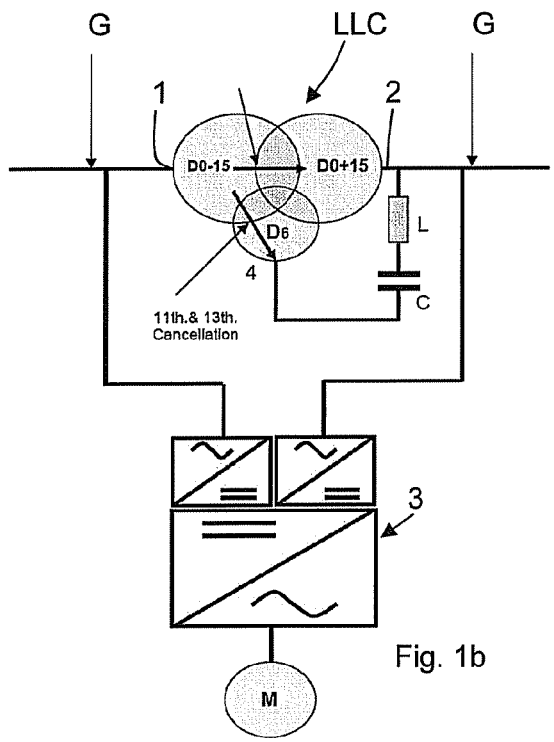

FIGS. 1a and 1b illustrate two different LLC transformers having a first and a second connection points 1,2 which in the figures are connected to a drive unit and having a power generator G on each side of the transformer unit. The LLC transformers are adapted to provide a phase shift between the connection points at the working frequency being 30° s, thus damping $5^{th}$ and $7^{th}$ harmonics. These solutions are discussed in detail in WO2005/119892 and in Norwegian Patent Application No. 2008 5145, which are included here by way of reference, and also provides damping of $11^{th}$ and $13^{th}$ harmonics.

Figure 2A:
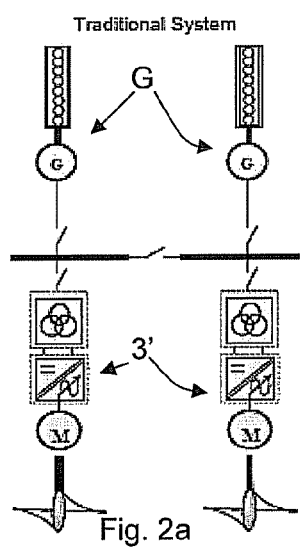

Traditionally the power supply for propulsion systems is organized as illustrated in FIG. 2a, where each generator G is coupled to a drive unit 3' having a motor connected through a transformer and a rectifier bridge. The systems may be coupled to each other through a switch in case one of the generators breaks down. A drawback with this solution is that there is a short circuit current limitation in the system which requires a rise in supply voltage if the supplied power is to be increased over a certain limit.

Figure 2B:
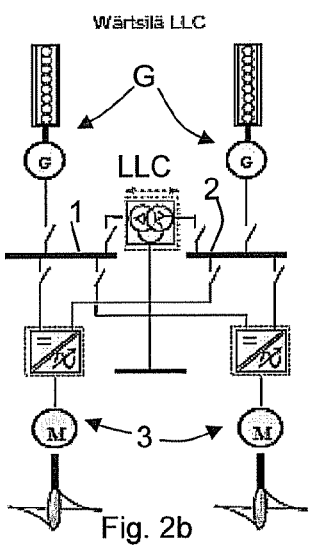

According to the invention as illustrated in FIG. 2b two generators G and two propulsion systems 3 are coupled together with an LLC transformer, e.g. of the types described in WO 2005/119892 or in Norwegian patent application No 2008 5145, between them, and without the transformer at the drive unit. As the LLC transformer provides additional impedance to the system the supplied current may rise without exceeding the short circuit limit. Thus a larger power may be provided to the system at low voltage. This has the advantageous effect of allowing the system to use less expensive parts even when having a larger supplied power. Another advantageous effect is that the short circuit current is reduced to 80%-85% of the short circuit current of traditional system, thus the discharged energy if a short circuit occurs is 64%-72% of the discharge energy in the traditional system, reducing the pressure wave from a discharge significantly.

During normal operation the system in FIG. 2b provide power to the propulsion system and the transformer will provide a filtering avoiding harmonic frequencies as described in the abovementioned patent applications.

If one of the generators G fails the situation changes but the propulsion system will get power through both inputs as the LLC transformer will act with an asymmetric load.

Figure 3B:
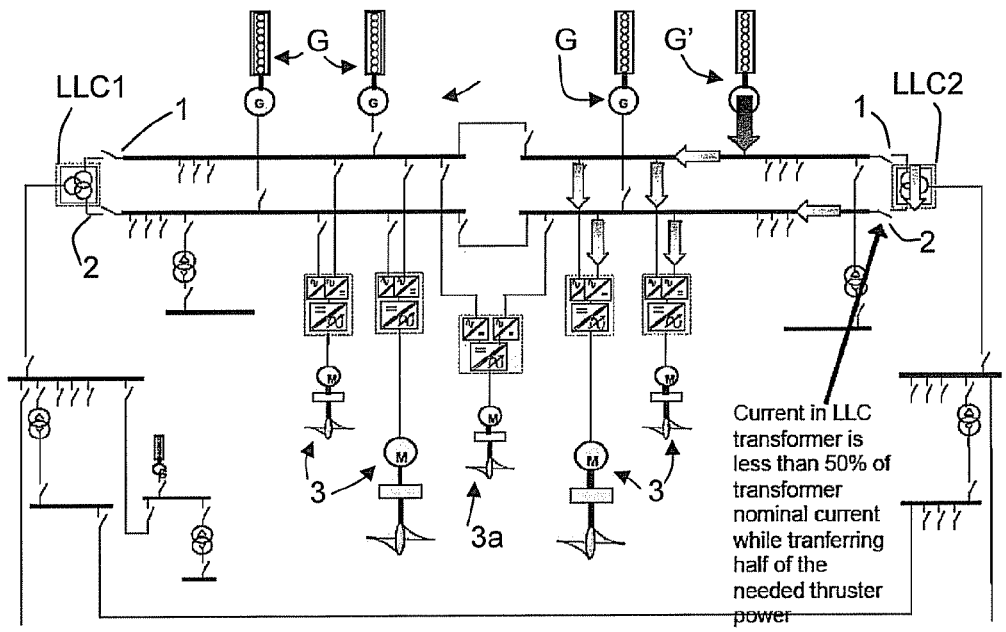

This principle is shown in FIGS. 3a,3b, wherein FIG. 3a illustrates a symmetric situation where two of the systems illustrated in FIG. 2b are coupled together so that the LLC transformers have the same phase shift, i.e. a relative 30° phase shift, as the first connection points 1 and second connection points 2 are connected. The LLC transformer units are thus connected in parallel to the drive units 3.

In FIG. 3b only one of the generators on the right side of the system is in use and power is supplied through the LLC transformer. The left side situation may be symmetric, but this is omitted from the drawing. Thus the LLC transformer transfers half the thrusters power and the drive units 3 may still be operated to a certain degree. This propulsion system still have half the power if one of the generators stops operating, which may be sufficient e.g. to a ship or rig in position. Also, if the left side system is connected to the right side system the total amount of power supplied to each drive unit is increase accordingly adding redundancy to the system.

When the right and left sides of the system is connected the effect of one generator G shutting down is even less, and also it should be noted that a drive unit may be provided with connections with both the left and the right sides of the illustrated system, as is illustrated with the drive unit in the middle.

In FIGS. 4a,b this principle is applied in e.g. a drill rig having four propulsion systems where in essence the system illustrated in FIGS. 3a,b is expanded to include four LLC transformers and drive systems with corresponding generators. As with the system illustrated in FIG. 3 the connection points 1,2 transformer units (LLC transformers) are connected with corresponding phase shifts so that the first and first, and second and second connection points are connected to each other. Thus a relative phase shift of + and −30° s are provided if moving along the connections between the transformer units, e.g. as a sequence of connection points [1,2]_[2,1]_[1,2]_[2,1] etc. (where [ ] represents a subsystem including an LLC transformer and 1,2 the connection points) so as to avoid oscillations propagating around the system.

The solution illustrated in FIGS. 4a and 4b are essentially symmetric 12 pulse and 6 pulse systems, respectively, where the two sides may be separated. This is due to restrictions in power supplies for ships and offshore installations and other solutions may be contemplated for other applications.

In FIG. 4a the right side represents a high redundancy system separated in two disconnectable subsystems PS, SB, each comprising two generators G separated by an LLC transformer unit, and where the drive units 3 in each sub system are connected to both sides 1,2 of the LLC transformers. If one of the generators G break down the current may pass through the LLC transformer and the drive units 3 will still be operated at a reduced capacity.

The left side PS of FIG. 4a illustrates a system providing even higher redundancy as the drive units 3 are connected to two subsystems being connected to the first 1 connection point of one LLC transformer unit and the second connection point of the second LLC transformer unit. Thus even if the generators and LLC transformer unit breaks down, e.g. due to a fire or other damages, the drive units may still be operated at a reduced capacity as they can draw part of the power from the neighbouring subsystem.

FIG. 4b illustrates a system similar to FIG. 4a, but where the drive units are based on a 6 pulse drive system.

The number of subsystems in the ring may be chosen, but an even number of subsystems must be used, especially in systems based on LLC transformer units having 30° phase shifts.

Even with the abovementioned alternating connection of the transformer units some harmonics may circulate in the system. In order to reduce circulation of $3^{rd}$ harmonic current phase to earth special precautions may be requires with respect to choice of a neutral earthing concept. By introducing a specially designed impedance earthing system consisting of a low pass filter the $3^{rd}$ harmonic will be suppressed sufficiently to allow the use of standard earth fault protection solutions.

The system according to the invention may be applied in a number of different applications where redundancy in the power supply is advantageous, such as in computer rooms or hospitals. In these applications the integration between the subsystems may be even better as redundancy may be provided between the left and right sides of the system illustrated in FIGS. 4a,4b.

For offshore installations the system are classified as LV (Low Voltage), MV (Medium Voltage) and HV (High Voltage) where the limits according to the IEC standard are LV<1000V, 1000V<MV<17500V and HV>17500V, and a typical LV system may be used at 690V. In the highest redundancy solution in FIG. 4a a breakdown, e.g. due to fire, in one of the subsystems will not stop the operation in that subsystem completely as power is supplied from the neighbour system applying 50% power to the drive unit.

As the short circuit current is decreased the system may be used at higher generated power without increasing the voltage. This reduced the need for high voltage power supplies and the installed transformer capacity is reduces by a factor of between 3:1 and 4:1 compared to traditional systems. This also reduces complexity of the system by limiting the need for cable ladders and cable terminations as well as other auxiliary systems, which in turn reduces the space needed for the system. As area usage is expensive on offshore installations this is an important advantage of the present system.

To summarize the invention relates to a power supply system comprising at least two drive units 3 having two power inputs and at least one power generator G providing electric power at a chosen system frequency and voltage. The system also comprises a transformer unit LLC having a first and a second connection points 1,2 where at least one of them are connected to a power generator G. The two inputs of each drive unit 3 is connected to the first 1 and the second 2 connection point of the transformer unit LLC. The transformer unit LLC is adapted to provide a chosen phase shift between said connection points 1,2 at the chosen system frequency and voltage and thus both reduction in the harmonic frequencies and a redundancy is obtained as both drive units may be utilized with only one operating generator G. In addition, as mentioned above, the impedance introduced by the transformer reduces the short circuit current.

On order to obtain full system redundancy at least one generator G is provided on each side of the LLC transformer unit, and for effective filtering of the $5^{th}$ and $7^{th}$ harmonics the phase shift over the LLC transformer should be approximately 30°.

According to one embodiment of the invention at least two transformer units LLC are connected in parallel relative to the drive units 3, the transformer units providing the same phase shift between the respective first and second connection points 1,2, the first and first and second and second connection points, respectively, being connected and each drive unit 3 being connected to first and second connection points 1,2. This way a system with high redundancy is obtained where one or more generators and LLC transformers may break down as long as one is operable.

According to a special embodiment of the invention at least one of said drive units 3 are connected to the first connection point 1 of a first of said transformer units LLC1 and the second connection point 2 of the second of said transformer units LLC2, the transformer units being provided with a switch between them, the drive unit thus being connected to both even if the switch is disconnected.

In larger systems an embodiment of the invention my be utilized consisting of a ring of transformer units LLC1,LLC2, LLC3,LLC4. En even number of transformer units is necessary to have the corresponding relative phase shifts i.e. the same relative phase shift being connected to the neighbouring transformer unit, and the drive units 3 having one input on each side of the transformer units LLC1,LLC2,LLC3,LLC4.

The transformer units may be connected to at least one power generator G and at least one drive unit 3, thus constituting a subsystem, and wherein at least one drive unit in each subsystem is connected to the first and the second connection points 1,2 in the corresponding LLC transformer unit in the system.

Alternatively at least one drive unit in each subsystem is connected to the first or second connection point 1(2) in the corresponding transformer unit in the system and the second (or first) connection point 2(1) in a neighbouring subsystem so as to increase the redundancy and making it possible to operate all drive units even if the generators and/or the LLC transformer unit in one subsystem fails.

The invention claimed is:

1. A power supply system comprising:
at least two drive units having two power inputs;
at least one power generator providing electric power at a chosen system frequency and voltage;
at least four transformer units, each of the at least four transformer units comprising first and second connection points, at least one of the first and second connection points is connected to a power generator;

wherein the two power inputs of each drive unit are connected to the first and second connection points of each of the at least four transformer units;

wherein the transformer unit provides a chosen phase shift between said inputs at the chosen system frequency and voltage; and wherein said at least four transformer units are connected in a ring having a chosen sequence of phase shifts in the first and second connection points between neighbouring transformer units along the ring.

2. The power system according to claim 1, comprising one power generator on each side of each transformer unit.

3. The power system according to claim 1, wherein a phase shift between the first and second connection points of each of the at least four transformer units is in a range of 30° s.

4. The power system according to claim 1, including at least two transformer units being connected in parallel relative to the at least two drive units, the at least four transformer units providing the chosen phase shift between respective first and second connection points, the first and first and second and second connection points, respectively, being connected and each drive unit being connected to first and second connection points.

5. The power system according to claim 4, wherein at least one of said at least two drive units are connected to the first connection point of a first of the at least four transformer units and the second connection point of a second of the at least four transformer units, the first and second transformer units being provided with a switch between them, the drive unit thus being connected to the first transformer unit and the second transformer unit even if the switch is closed.

6. The power system according to claim 1, wherein said at least four transformer units are provided with the chosen phase shift between neighbouring transformer unit, and the at least two drive units have one input on each side of the transformer units.

7. The power system according to claim 1, wherein each transformer unit is connected to at least one power generator and at least one drive unit constituting a subsystem, and wherein at least one drive unit in each subsystem is connected to the first and the second connection points in a corresponding transformer unit of the at least four transformer units in the power system.

8. The power system according to claim 1, wherein each transformer unit is connected to at least one power generator and at least one drive unit constituting a subsystem, and wherein at least one drive unit in each subsystem is connected to the first or second connection point in a corresponding transformer unit of the at least four transformer units in the system and the second (or first) connection point in a neighbouring subsystem.

9. The power system according to claim 1, wherein each of the two power inputs of said at least two drive units are coupled to earth through a low pass filter adapted to suppress $3^{rd}$ harmonics of the chosen frequency.

* * * * *